United States Patent
Brissette et al.

(10) Patent No.: US 6,267,203 B1
(45) Date of Patent: Jul. 31, 2001

(54) AXLE HOUSING BOWL LUBRICANT TEMPERATURE REDUCTION SYSTEM

(75) Inventors: Ronald N. Brissette, Lake Orion; Christopher S. Keeney; Dennis A. Kramer, both of Troy, all of MI (US); Jack R. McKenzie, Hendersonville, NC (US); Brian J. Mueller, Lake Orion; Dale Bell, Ortonville, both of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/426,632

(22) Filed: Oct. 26, 1999

(51) Int. Cl.[7] ........................................... F01M 9/06
(52) U.S. Cl. ........................ 184/6.12; 74/467; 74/606 A
(58) Field of Search .............................. 184/6.12, 104.1; 475/160; 74/467, 606 A

(56) References Cited

U.S. PATENT DOCUMENTS

| | | | |
|---|---|---|---|
| 3,847,249 | * 11/1974 | Oehring | 184/6.12 |
| 4,244,242 | * 1/1981 | Uno et al. | 74/467 X |
| 4,612,818 | * 9/1986 | Hori et al. | 74/467 |
| 5,316,106 | * 5/1994 | Baedke et al. | 184/6.12 |
| 5,540,300 | * 7/1996 | Downs et al. | 184/6.12 X |
| 6,132,329 | * 10/2000 | Tison | 475/160 |
| 6,135,241 | * 10/2000 | Ganguly et al. | 184/6.12 X |

* cited by examiner

Primary Examiner—Rodney H Bonck
(74) Attorney, Agent, or Firm—Carlson, Gaskey & Olds

(57) ABSTRACT

An improved method of removing heat from a lubricant in an axle housing includes the use of a deflector in the axle housing. The deflector is positioned on a cover secured to the housing bowl. Lubricant is thrown against the deflector by a ring gear in the bowl. The lubricant is directed by the deflector outwardly to the axle ends of the axle assembly. In this way, the lubricant is exposed to a greater surface area, and the cooling efficiency of this system is greatly improved.

6 Claims, 1 Drawing Sheet

AXLE HOUSING BOWL LUBRICANT TEMPERATURE REDUCTION SYSTEM

BACKGROUND OF THE INVENTION

This invention relates to a modification to an axle housing bowl to reduce the temperature of an entrapped lubricant.

Axle housings as typically utilized in modern vehicles incorporate a central bowl housing, and a large ring gear which assists in driving a differential which splits a drive input to both sides of the axle. Typically, the ring gear and differential are housed in a housing bowl, and the drives leading to the two sides of the vehicle extend through axle housing legs. The housing bowl typically extends both above and below the axle housing legs. Lubricant is maintained in the housing bowl. The lubricant flows to the lower areas of the housing bowl. The housing bowl is quite hot due to the rotating gears. The ring gear rotates throughout the lubricant which becomes quite hot.

The axle housing legs leading to the wheels tend to be lower temperature. However, due to the structure of the axle bowl and the axle housings, lubricant typically does not flow to the axle housing legs.

SUMMARY OF THE INVENTION

In a disclosed embodiment of this invention, a deflector is placed in a location such that oil thrown by the ring gear hits the deflector. The deflector is positioned to direct the deflected lubricant toward the axle housings. In this way, the oil is moved from the housing bowl outwardly toward at least one of the wheel ends. The lubricant is exposed to greater housing areas, and thermal conduction of the heat away from the housing is improved.

In a preferred embodiment of this invention, the deflector is angled downwardly in two directions, both toward the ring gear, and also downwardly in a direction towards the axle housing. In this way, the lubricant which hits the deflector flows along the deflector and toward the axle housing.

These and other features of the present invention can be best understood from the following specification and drawings, the following of which is a brief description.

DETAILED DESCRIPTION OF A PREFERRED EMBODIMENT

Figure 1:
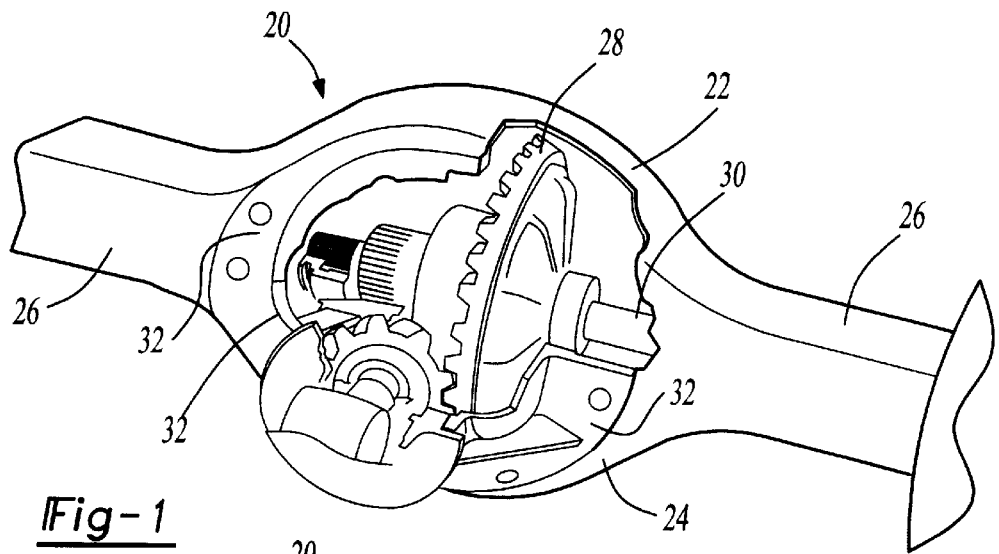
FIG. 1 is a schematic view of an axle housing incorporating the present invention.

An axle assembly 20 is shown in FIG. 1 having a housing bowl 22 with a lower bowl 24. Axle housing legs 26 extend from each side of the housing 22, and from the bowl 24. As can be appreciated from FIG. 1, the bowl portion 24 is vertically lower than any portion of the axle housings 26. Thus, lubricant tends to collect in the bowl portion 24, and will typically not flow from the bowl 24 to the axle housing 26.

A ring gear 28 is driven to rotate within the bowl 24 and drives a differential, as known, to drive a shaft 30 extending to each side of the assembly 20. A cover 32 covers the bowl 24, and encloses the ring gear 28.

Figure 2:
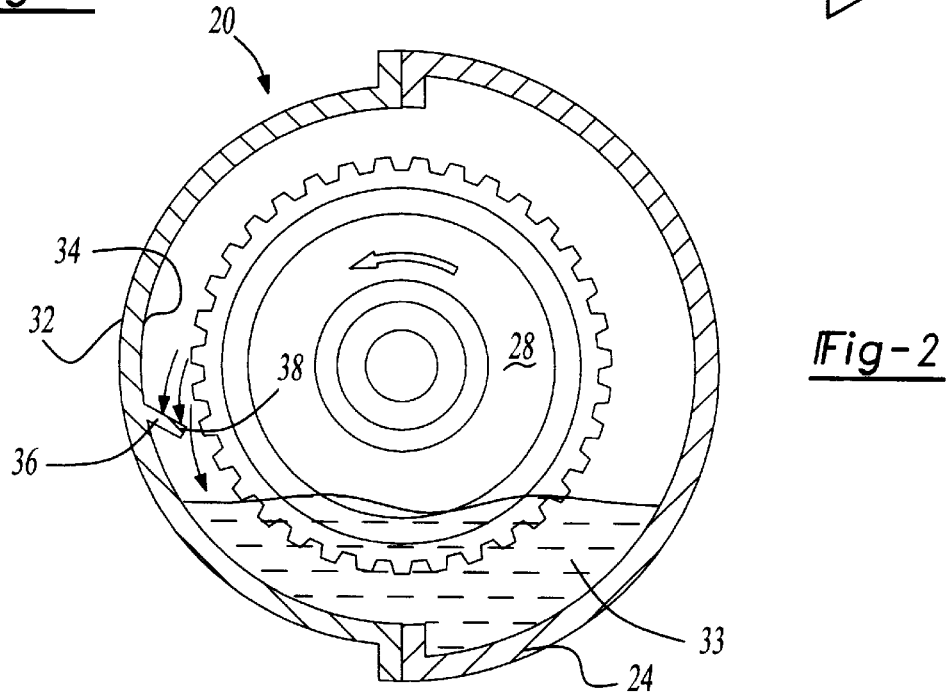
FIG. 2 is a cross-sectional view of one portion of an axle housing as part of the present invention.

As shown in FIG. 2, the cover 32 is secured to the bowl 24 such as by being bolted. A sump 33 is defined in the bottom of the bowl 24. Ring gear 28 rotates within the sump, in a predetermined direction when the vehicle is being driven forwardly. As is known, the ring gear 28 captures and carries the lubricant from the sump 33 when it rotates. In the prior art, the lubricant becomes heated by not only the ring gear 28, but also by the associating gears received in bowl 24, not shown. Since bowl 24 is vertically lower than the axle housings 26, the lubricant does not flow to axle housing legs 26. Instead, lubricant remains in bowl 24 and becomes hot. The bowl has a limited amount of surface area, and the convection of heat away from the lubricant in the bowl is not as efficient as would be desired. As is clear from FIG. 2, the ant deflector 36 is within the vertical envelope of the gear 28. As such, the deflector will be best positioned to deflect oil into the axle housings 26. As is clear from FIG. 3, the deflector is with the lateral width of the gear 28.

A deflector 36 is positioned inwardly of an inner wall 34 of the cover 32. The deflector 36 is placed in position such that a forward or inner end 38 is spaced downwardly and facing the ring gear 28. Now, when lubricant is flung off the ring gear 28 toward the housing wall 34, it hits an upper side of the deflector 36.

Figure 3:
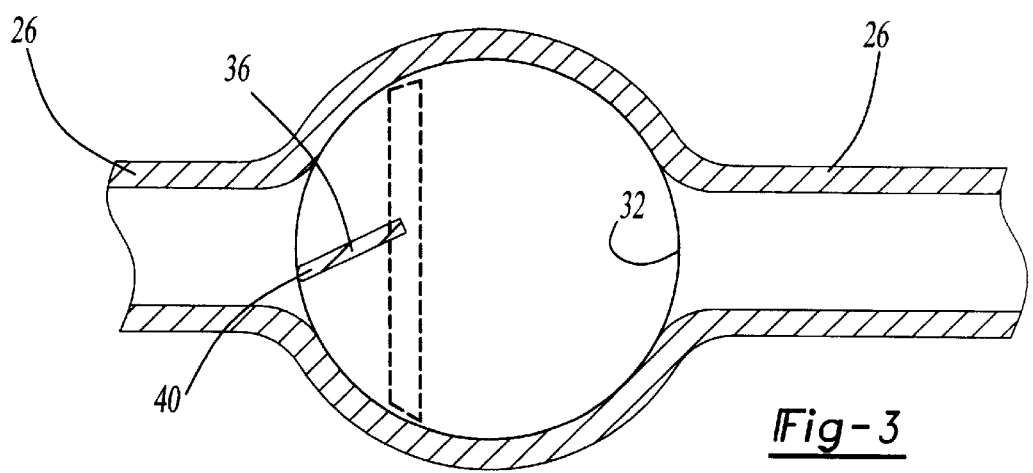
FIG. 3 is a view generally perpendicular to the FIG. 2 view.

As shown in FIG. 3, deflector 36 has an outer end 40 aligned with an inner end of one axle housing 26. The lubricant is thus directed along the deflector 36 into the axle housing leg 26. The lubricant can then flow outwardly along the axle housing. Since a portion of the lubricant is now in the axle housing legs, the surface area available for cooling the lubricant is greatly increased over the prior art.

Further, as is shown in FIG. 3, an opposed deflector 42 may also extend to the other axle housing side 26.

Although a preferred embodiment of this invention has been disclosed, a worker in this art would recognize that several modifications would come within the scope of this invention. For that reason, the following claims should be studied to determine the true scope and content of this invention.

What is claimed is:

1. An axle housing comprising:

a central bowl having a vertically lower bowl portion, and a pair of axle housings extending from opposed sides of said central bowl, said central bowl having a portion which is vertically lower than portions of said axle housing when said axle housing is positioned on a vehicle;

a ring gear rotating within said bowl, and facing an inner wall of said bowl, a deflector positioned between said wall and said ring gear, and aligned to deflect lubricant from said ring gear outwardly into at least one of said axle housings, said deflector being positioned at a vertical position within a vertical extent of said ring gear, and further positioned to be within a lateral extent of said ring gear, said lateral extent being defined along a rotational axis of said ring gear and said vertical extent being defined perpendicular to said rotational axis.

2. An axle housing as recited in claim 1, wherein there are a pair of deflectors designed to deflect lubricant to both sides of said central bowl.

3. An axle housing as recited in claim 1, wherein said wall is provided by a removable cover bolted to said bowl of said housing.

4. An axle housing as recited in claim 1, wherein said deflector is angled downwardly toward said ring gear from said wall.

5. An axle housing as recited in claim 4, wherein said deflector is also angled downwardly from a central area in said housing bowl toward said axle housing such that said deflector is angled in two directions.

6. An axle housing as recited in claim 1, wherein said deflector is angled downwardly and toward said axle housing in a direction moving away from a center of said bowl.

* * * * *